(12) United States Patent
Fischer (10) Patent No.: US 7,792,130 B2
(45) Date of Patent: Sep. 7, 2010

(54) WIRELESS DEVICE AND METHOD OF TRANSMITTING UPLINK DATA AND BUFFER STATUS REPORTS IN A WIRELESS COMMUNICATIONS SYSTEM

(75) Inventor: Patrick Fischer, Paris (FR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 12/189,559

(22) Filed: Aug. 11, 2008

(65) Prior Publication Data

US 2009/0052420 A1 Feb. 26, 2009

Related U.S. Application Data

(60) Provisional application No. 60/955,382, filed on Aug. 12, 2007.

(30) Foreign Application Priority Data

Jul. 1, 2008 (EP) .................................. 08159464

(51) Int. Cl.
    *H04L 12/56* (2006.01)
(52) U.S. Cl. ...................... 370/412; 370/310; 370/328; 455/550.1; 455/452.2; 455/422.1
(58) Field of Classification Search ......... 455/450–453, 455/550.1, 452.2, 422.1; 370/395.41, 412, 370/328
See application file for complete search history.

(56) References Cited

U.S. PATENT DOCUMENTS

| | | | |
|---|---|---|---|
| 6,486,809 B1 * | 11/2002 | Figoli | 341/141 |
| 7,136,395 B2 * | 11/2006 | Lupien et al. | 370/472 |
| 2004/0160919 A1 * | 8/2004 | Balachandran et al. | 370/335 |
| 2004/0160940 A1 * | 8/2004 | Kim | 370/349 |
| 2007/0097916 A1 | 5/2007 | Eyuboglu et al. | |
| 2007/0097918 A1 | 5/2007 | Cai et al. | |

FOREIGN PATENT DOCUMENTS

| | | |
|---|---|---|
| EP | 1796335 | 6/2007 |
| WO | 2007/052922 | 5/2007 |
| WO | 2006/118418 | 11/2009 |

OTHER PUBLICATIONS

3GPP "Universal Mobile Telecommunications System (UMTS); FDD enhanced uplink; Overall description; stage 2" ETSI TS 125 309 v6.2.0, Mar. 2005.

(Continued)

*Primary Examiner*—Huy Phan
*Assistant Examiner*—Vladimir Magloire
(74) *Attorney, Agent, or Firm*—Lee, Hong, Degerman, Kang & Waimey (57) ABSTRACT

The method provides buffer status reporting for the transmission of uplink data from a wireless device to a base station. Uncompressed data is stored in a first buffer of the wireless device. A buffer status report is transmitted from the wireless device to the base station, where the buffer status report contains information indicating an amount of the uncompressed data to be transmitted from the wireless device. The information is dependent on the amount of the uncompressed data stored in the first buffer.

11 Claims, 5 Drawing Sheets

OTHER PUBLICATIONS

3GPP "Technical Specification Group Radio Access Network; Evolved Universal Terrestrial Radio Access (E-UTRA) Medium Access Control (MAC) protocol specification." Release Nov. 8, 2007.

Nokia et al., "Radio Link Failure Recovery", 3GPP TSG-RAN WG2 #58, Jun. 29, 2007.

Nokia et al., "Handover Failure recovery" 3GPP TSG-RAN WG2 #58, May 11, 2007.

Qualcomm "Shared Secret for radio Link Failure Procedure", 3GPP TSG-RAN WG2 #59, Aug. 24, 2007.

Bajzik, L., et al., "Impact of Intra-LTE Handover with Forwarding on the User Connections," 2007 16Th IST Mobile and Wireless Communications Summit, pp. 1-5, Jul. 1, 2007.

Nokia Siemens Networks, et al., "Radio Link Failure Recovery," 3GPP TSG-RAN WG2 Meeting #58, R2-072382, Jun. 2007.

Nokia, et al., "Handover Failure Recovery," 3GPP TSG-RAN WG2 Meeting #58, R2-071717, May 2007.

\* cited by examiner

WIRELESS DEVICE AND METHOD OF TRANSMITTING UPLINK DATA AND BUFFER STATUS REPORTS IN A WIRELESS COMMUNICATIONS SYSTEM

CROSS-REFERENCE TO RELATED APPLICATIONS

Pursuant to 35 U.S.C. §120, this application claims priority to U.S. Provisional Application No. 60/955,382 filed on Aug. 12, 2007, the contents of which is incorporated herein by reference. Pursuant to 35 U.S.C. §119(a), this application claims the benefit of earlier filing date and right of priority to European Application No. 08159464.0, filed on Jul. 1, 2008, the contents of which is incorporated by reference herein in its entirety.

BACKGROUND OF THE INVENTION

1. Field of the Invention

The present invention relates to packet transmission in a cellular communications network, and in particular to the reporting of buffer status for uplink data packets from a wireless device to a base station. While it is described below in the context of an LTE ("long term evolution") type of cellular network for illustration purposes and because it happens to be well suited to that context, those skilled in the communication art will recognize that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Figure 1:
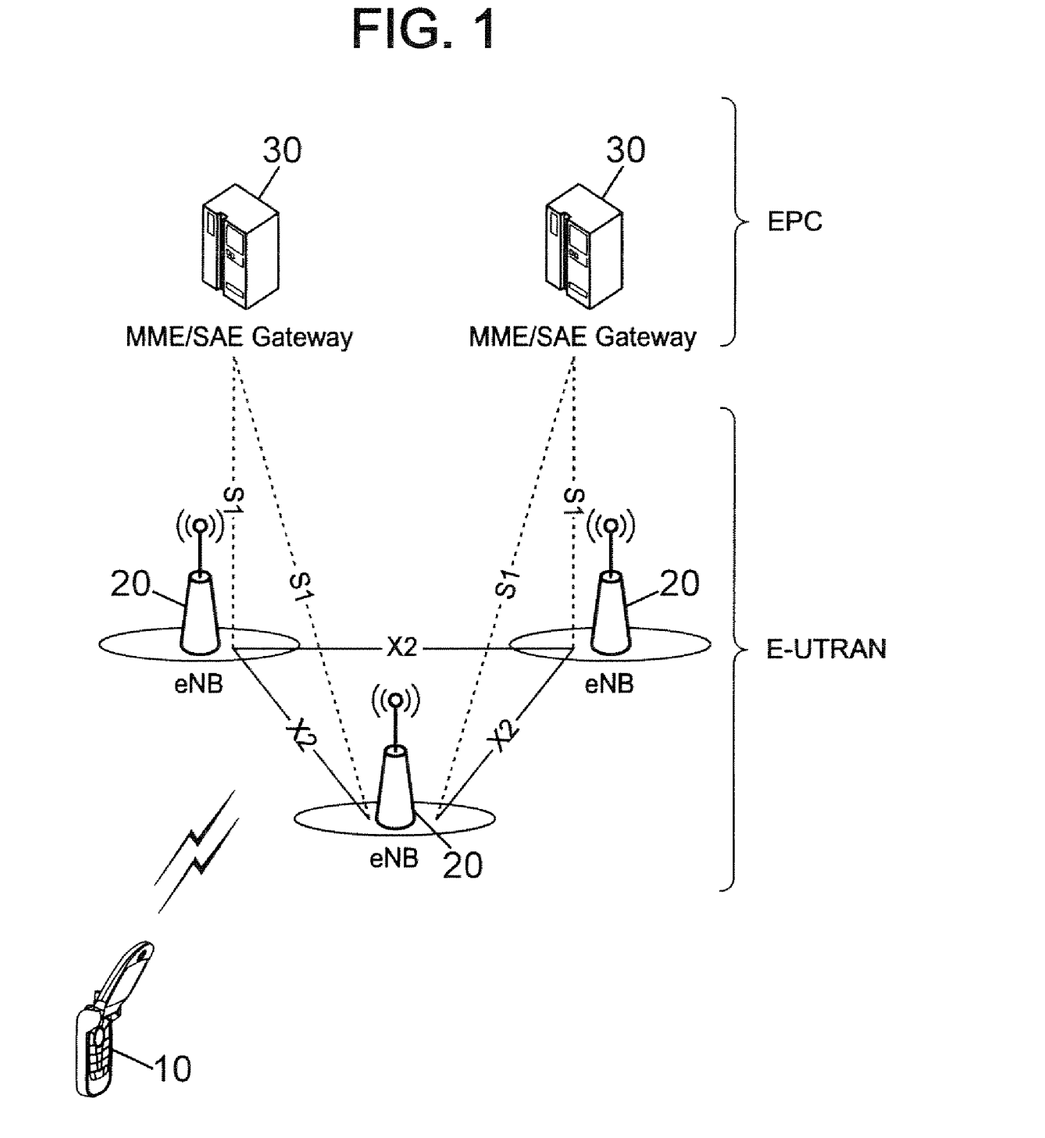
FIG. 1 is a block diagram illustrating network structure of an E-UMTS (or LTE) system.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNodeB, or eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity, MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2A:
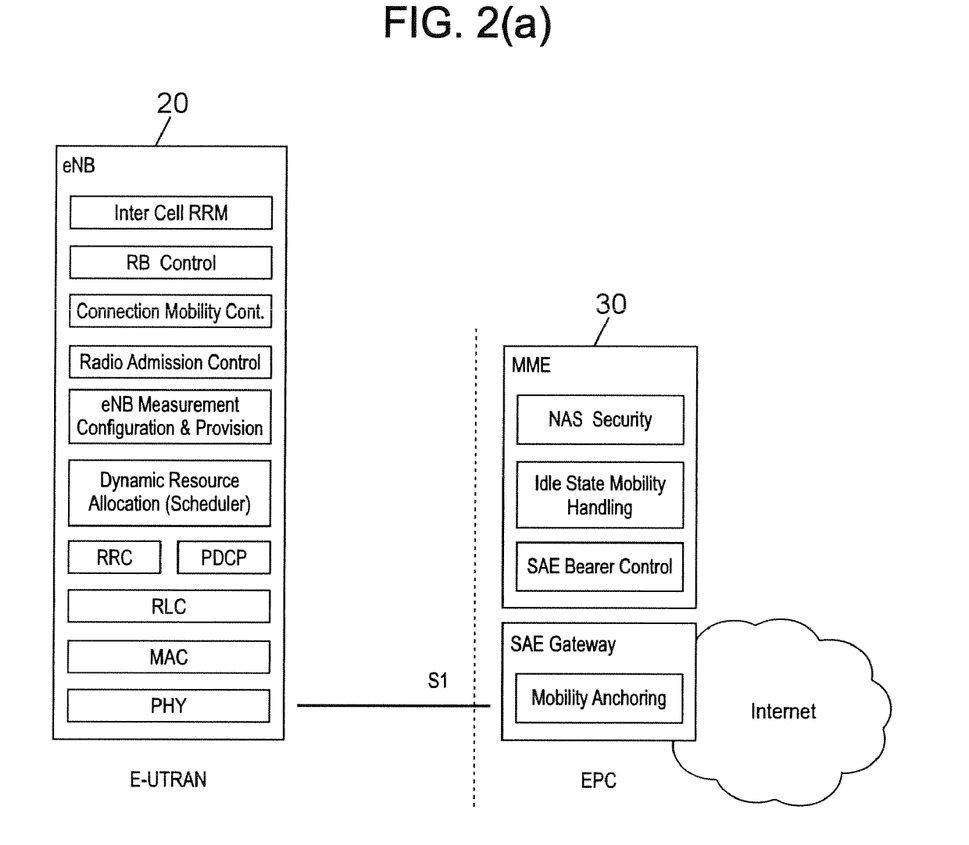
FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 2(a) is a block diagram depicting an architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UES 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination. LTE-IDLE state management, ciphering of the user plane, System Architecture Evolution (SAE) bearer control, and ciphering and integrity protection of Non-Access Stratum (NAS) signaling.

Figure 2B:
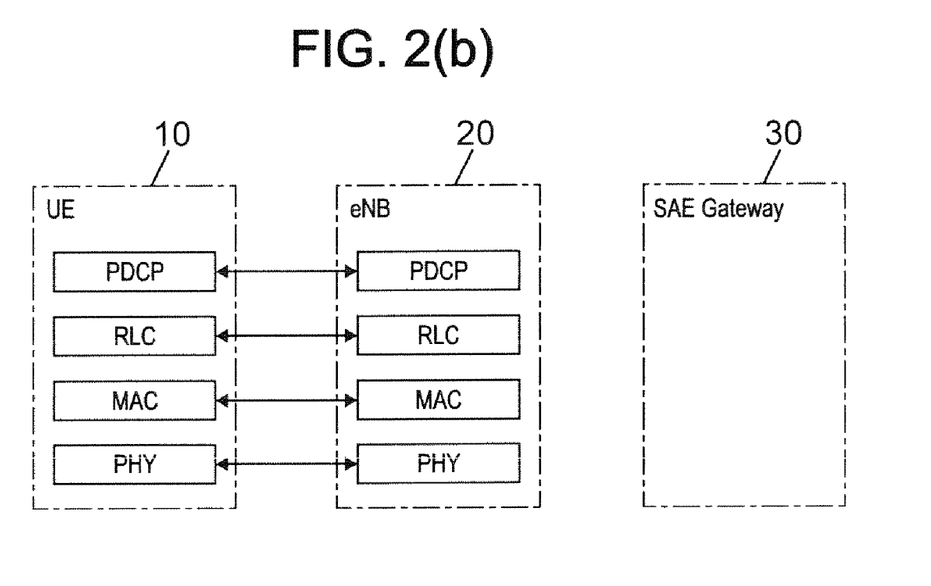
Figure 2C:
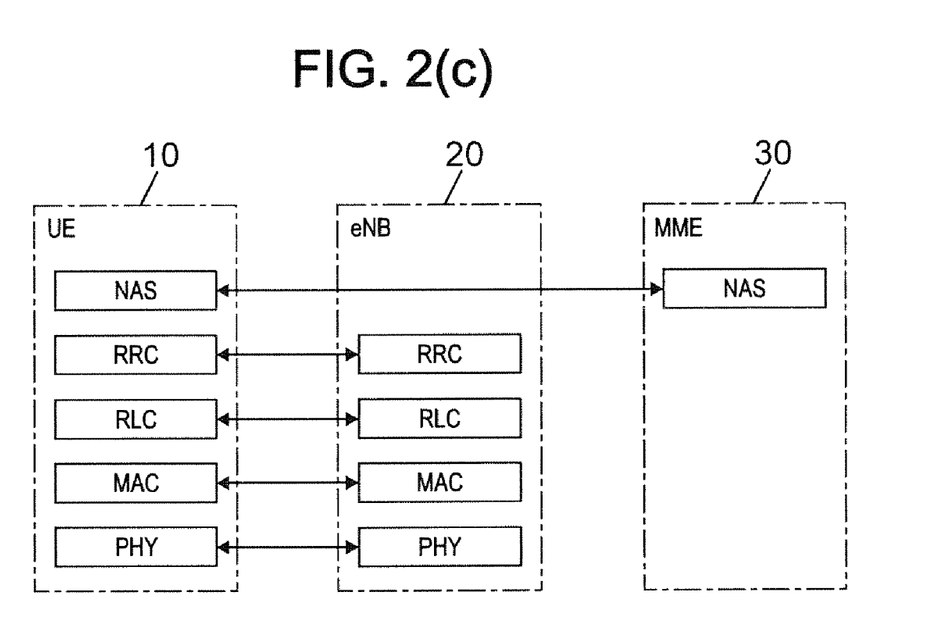

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the control plane. As illustrated, the RRC layer (terminated in an eNodeB 20 on the network side) may perform functions such as broadcasting, paging. RRC connection management, Radio Bearer (RB) control, mobility functions, and UE measurement reporting and controlling. The NAS control protocol (terminated in the MME of gateway 30 on the network side) may perform functions such as a SAE bearer management, authentication. LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different such as RRC_IDLE and RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

Figure 3:
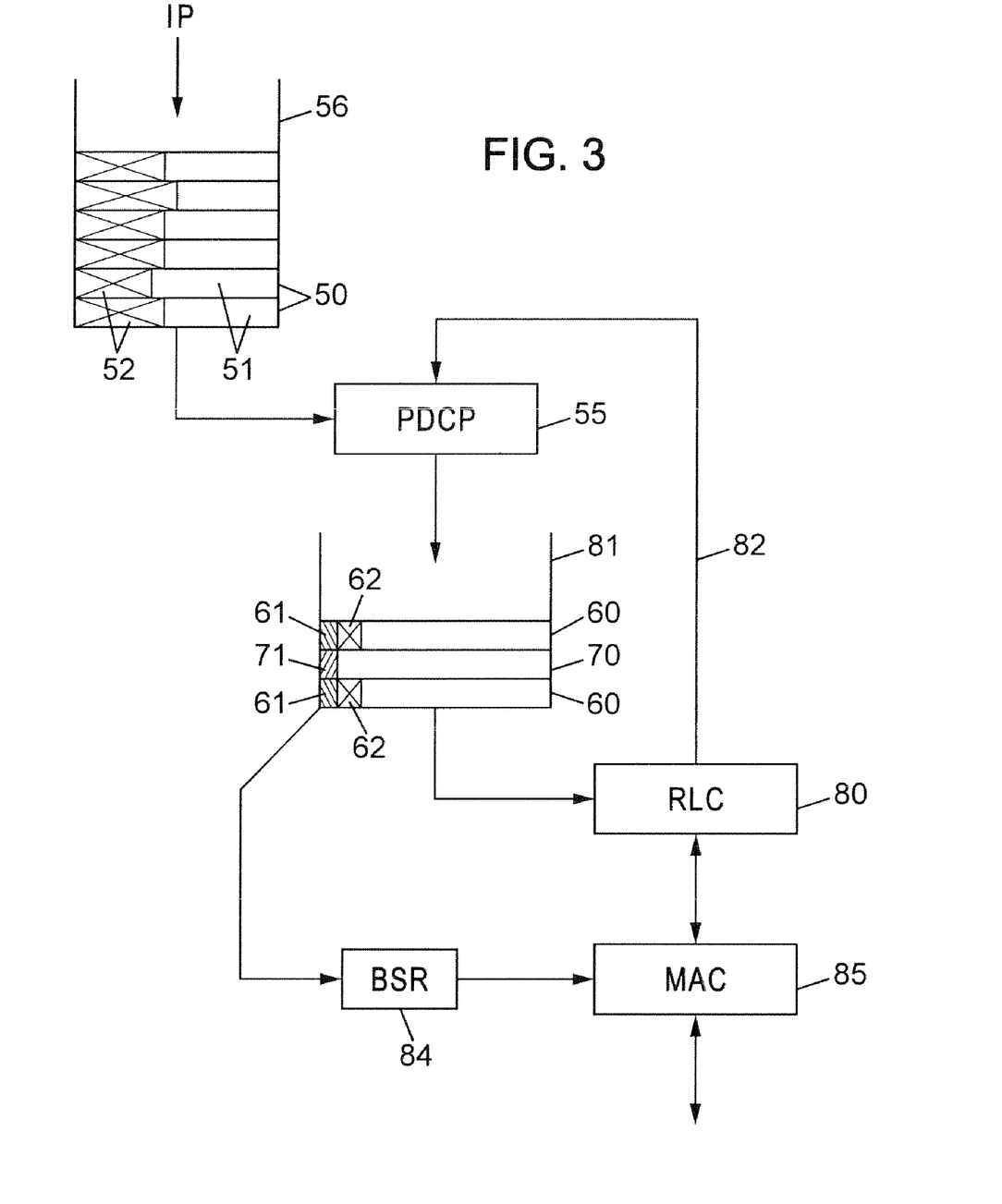
FIG. 3 is a diagram illustrating a buffer arrangement in relation to user-plane protocol stacks as depicted in FIG. 2(b).

FIG. 3 illustrates diagrammatically the buffering of uplink user traffic in Layer 2 on the UE side. U-plane traffic as received from Layer 3 consists typically of IP packets 50 with payload 51 from upper application layers, to be processed by the logic 55 of the PDCP layer. These packets 50 form PDCP service data units (SDUs) transferred from upper layers and stored in a PDCP buffer 56. Each packet 50 has a header 52 which includes an IP header and possibly other header fields from an upper layer protocol such as the real time protocol (RTP) in the case of a voice over IP (VoIP) application for example.

The PDCP protocol data units (PDUs) 60, 70 generated by the PDCP layer 55 are transferred to the RLC layer 80 where they are stored in an RLC buffer 81. Each PDCP PDU 60, 70 has a short header 61, 71 including a PDCP sequence number and an indication of a PDU type.

Some PDCP PDUs 60 (indicated in the short header 61) convey user traffic, usually in the form of one IP packet per PDU. The header 52 of this IP packet is compressed in the PDCP layer 55 (compressed header 62 shown in FIG. 3) by a header compression algorithm called RoHC (robust header compression). The PDCP layer may also encrypt the user data and add a message authentication code for integrity protection (MAC-I). The header compression is based on the fact that in an IP header many of the fields do not change dynamically. For example, during a VoIP call the target IP address and the source IP address typically remain unchanged. Thus it is only necessary to include this type of information when it changes. RoHC schemes can take advantage of various kinds of redundancy in protocol headers, as is well known in the art. See, for example, the request for comments (RFC) 4995, "The RObust Header Compression (ROHC) Framework", published in July 2007 by the Internet Engineering Task Force (IETF).

Other uplink PDCP PDUs 70 (as indicated in the short header 71) are PDCP control PDUs that convey control information, such as a PDCP status report on missing or acknowledged downlink PDCP SDUs following a handover. Such a status report is used by the peer PDCP layer in the eNodeB servicing the new cell to determine which PDCP SDUs should be retransmitted.

Another example of the control information is header compression control information, such as interspersed RoHC feedback generated by the header compression algorithm in order to secure robustness of the compression process. In order to cope with the scenario where a packet that indicates a change in a header field is missed, the receiver can send such RoHC feedback information to the sender, such that critical information, e.g. updates, is repeated. Thus the sender should compress the header as late as possible in order to make sure that it is possible to react on received RoHC feedback information. In FIG. 3, arrow 82 designates RoHC feedback as received by the UE 10 on a downlink channel and supplied to the RoHC algorithm of the PDCP layer 55 executed for the transmission of uplink user data.

The RLC layer 80 processes the PDCP PDUs to control data transfer in transparent, acknowledged or unacknowledged mode and to execute the relevant automatic repeat request (ARQ) procedures. The RLC PDUs for each logical channel are passed to the MAC layer 85 which adds MAC header information and performs other medium access functions, such as scheduling or hybrid ARQ (HARQ) processes.

One of the MAC signaling procedures implemented in the uplink transport channels is the buffer status reporting procedure. It is used to provide the serving eNodeB 20 with information about the amount of uplink data buffered in the UE 10. Such information, along with other information such as priorities allocated to different logical channels, is useful to the uplink scheduling algorithms run by the MAC layer of the eNodeB 20 to determine which UEs, or logical channels, should be granted radio resources at a given time. The buffer status information indicates the amount of data available for transmission. In UMTS, the scheduling information indicates the data stored in the RLC buffer 81, as illustrated by block 84 in FIG. 3, and the MAC layer requests the RLC layer to report the amount of data available such that the amount of data can be reported to the network in a buffer status report (BSR) included into certain uplink MAC PDUs.

In LTE however, header compression is used in order to reduce the amount of data by applying a specific coding of the IP header as specified by the RoHC algorithm. Thus the amount of data sent to the PDCP peer entity is typically bigger than the amount of data that is sent from the PDCP to the RLC entity. The need to insert PDCP control PDUs from time to time is another source of errors.

When RoHC is used, it does not seem to be possible for the transmitter to indicate the exact size of the data that remains to be transmitted, because it would need to be compressed beforehand. Especially the feedback information from the receiver can affect the size of the data. For the transmitter, it is not possible to know the exact size of the data after compression until the compression is performed and thus it is not possible to indicate the exact size of the buffer.

An object of the present invention is to improve the reliability of the amount of buffered data reported by a wireless device to a network when compression is used.

SUMMARY OF THE INVENTION

A method of transmitting a buffer status report from a wireless device to a base station of a wireless communications system is hereby proposed. The method comprises storing uncompressed data in a first buffer of the wireless device and transmitting, from the wireless device to the base station, a buffer status report containing information on an amount of the uncompressed data to be transmitted from the wireless device, where the information is dependent on the amount of the uncompressed data stored in the first buffer.

In one embodiment, the method further comprises determining the size of compressed data depending on information received from the base station. The method may further comprise performing compression of the uncompressed data depending on feedback information received from the base station; storing the compressed data in a second buffer; and transmitting the stored compressed data from the wireless device to the base station.

According to another embodiment, the method comprises storing user packets in a first buffer of the wireless device, each user packet including a respective header; converting user packets taken out of the first buffer into data units written to a second buffer of the wireless device, wherein the conversion includes header compression applied to the headers of the user packets depending on feedback information received from the base station; transmitting, from the wireless device to the base station, data units read from the second buffer; and transmitting, from the wireless device to the base station, a buffer status report containing information on an amount of data to be transmitted from the wireless device, said information being dependent on an amount of data stored in the first buffer.

Because the header compression takes into account feedback information from the network, it is desirable to apply it as late as possible. This means that the amount of data stored at a given time in the second buffer (e.g. an RLC buffer) will often be small compared to the amount of data stored at the same time in the first buffer (e.g. a PDCP buffer). Reporting buffer status based on the contents of the first buffer (only, or preferably in combination with the contents of the second buffer as well) makes it possible to obtain a fairly accurate estimate while keeping a good reactivity to the header compression feedback information.

The base station can take into account the buffer status reports from one or more wireless devices to decide in real time on scheduling of the physical channels, which is a medium access control (MAC) procedure. It is particularly useful when the header represents a significant portion of the user packets.

Furthermore the information on data available for transmission can also be sent from the UE to the network in the framework of other procedures and especially control plane RRC procedures. In particular, traffic volume measurements (TVM) can be requested by the eNodeB controlling the UE measurement reports. Such measurements can be used, e.g., in order to trigger a state transition for the UE so as to provide a suitable type of channel for transmission of the UE data.

Typically, the data units written to the second buffer of the wireless device further comprise control data units containing information generated in a protocol layer implementing the conversion of the user packets. In such an embodiment, the buffer status report may further indicate an amount of data stored in the second buffer. Alternatively, the buffer status report may indicate the amount of compressed data stored in the second buffer (excluding the control data units).

In an embodiment, the buffer status report indicates an amount of uncompressed data stored in the first buffer. An additional buffer status report containing an estimation of a compression factor achieved by applying the header compression may then be transmitted from the wireless device to the base station. The additional buffer status report can be transmitted at a lower frequency than the buffer status report indicating the amount of uncompressed data stored in the first buffer.

The buffer status report may also indicate an estimation of an amount of compressed data resulting from the uncompressed data stored in the first buffer. A compression factor can be estimated locally from the behavior of the header compression algorithm. Alternatively, the value of the compression factor can be provided by the base station.

The buffer status report may also indicate an amount of data depending on a size of further headers added for transmission of the data units read from the second buffer, such as RLC/MAC headers.

Another aspect of the invention relates to a wireless device for communication with a network having a plurality of base stations. The wireless device comprises a first buffer for storing user packets, each user packet including a respective header; a converter for converting user packets taken out of the first buffer into data units written to a second buffer of the wireless device, where the converter applies header compression to the headers of the user packets depending on feedback information received from a base station; and a transmitter arranged for transmitting to the base station data units read from the second buffer and a buffer status report containing information on an amount of data to be transmitted from the wireless device, where the information is dependent on an amount of data stored in the first buffer.

BRIEF DESCRIPTION OF THE DRAWINGS

Other objects, features and advantages of the invention will become apparent when reading the following description on non-limiting exemplary embodiments with reference to the accompanying drawings.

DETAILED DESCRIPTION OF THE INVENTION

A method of providing buffer status information about packet transmission from a wireless device to a base station of a cellular network is disclosed below in the particular, non-limiting context of an LTE system.

Figure 4:
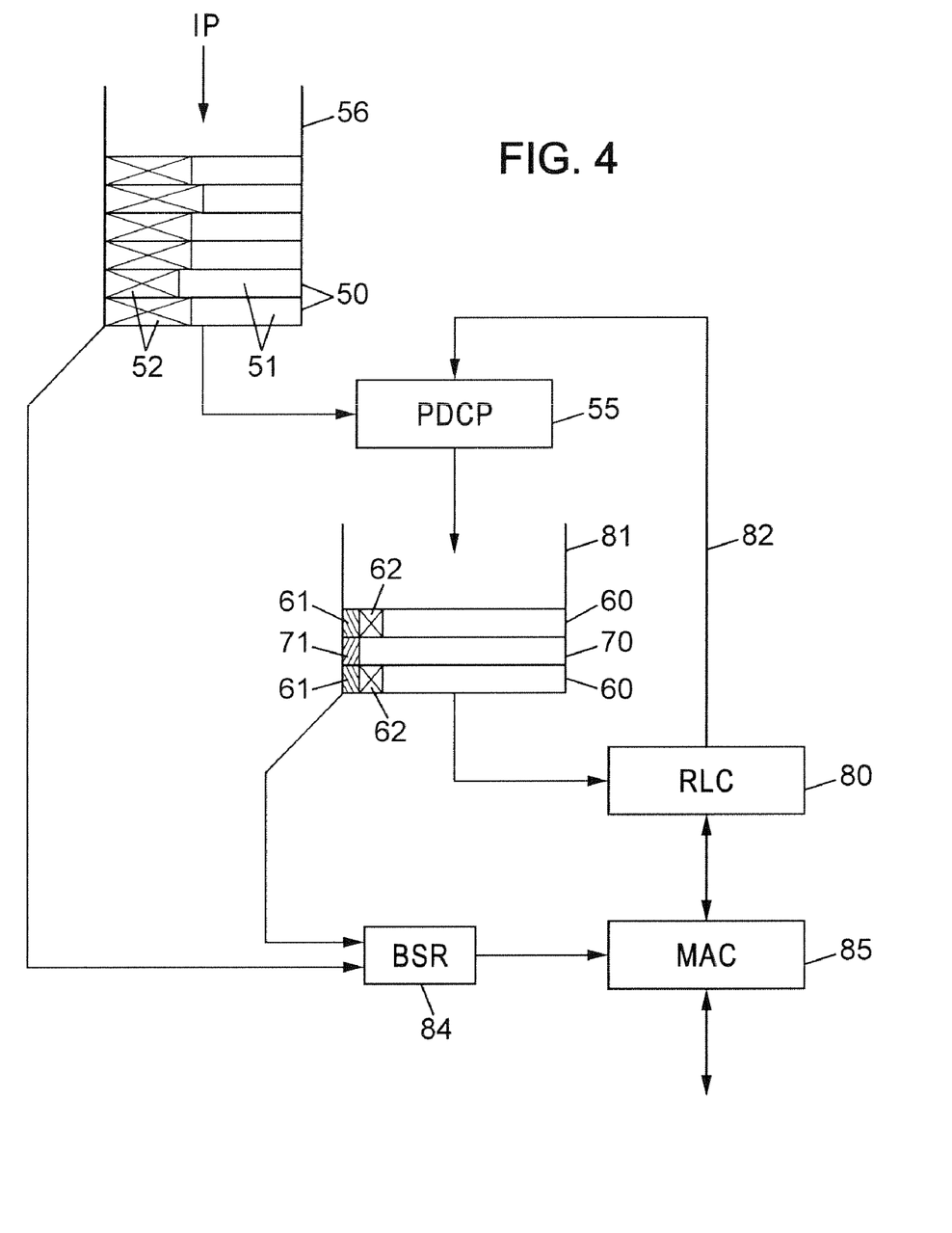
FIG. 4 is a diagram illustrating a buffer arrangement in relation to user-plane protocol stacks as depicted in FIG. 2(b) in an embodiment of the invention.

FIG. 4 illustrates an alternative way of reporting buffer status, compared to the one discussed above with reference to FIG. 3. In the embodiment of FIG. 4, the information used by the buffer status reporting block 84 to generate the BSR includes information about the contents of the PDCP buffer 56.

Every time a PDCP SDU 50 (IP packet) is read from the PDCP buffer 56 for conversion into a PDCP PDU 60, the PDCP layer 55 takes it out of the buffer 56. So the PDCP buffer 56 contains only user packets which have not yet been processed by the PDCP layer and in particular by the RoHC algorithm.

As long as a PDCP SDU 50 has not been processed by the PDCP layer 55, it is not possible to know the exact size of the PDCP PDU 60 that will correspond to it, because that size depends on any RoHC feedback that the PDCP layer 55 may receive from the peer PDCP entity in the eNodeB. Also, it is difficult to anticipate the amount of data that will be added as PDCP control PDUs 70 (status report on acknowledgements upon handover and/or RoHC feedback for the reverse direction). However, due to the policy of late header compression in the PDCP layer 55, a given level of filling of the RLC buffer 81 may give little information about the actual amount of user data currently queuing for transmission in the UE 10: the PDCP buffer 56 may be almost empty, or it may contain much more data than the RLC buffer 56. So the amount of packet data queuing in the PDCP buffer 56 is an important parameter for a reliable reporting of the UE buffer status.

In a first embodiment, the BSR indicates the size (as a number of octets, typically) of non-compressed data for transmission, as stored in the PDCP buffer 56. This is a simple way of reporting buffer status. Depending on what other information would be transmitted, the BSR may further include the size of the PDCP PDUs that contain compressed PDCP SDUs that have already been passed to the RLC layer, namely PDUs 60 stored in the RLC buffer 81 with a short header 61 designating a PDU for user data traffic. Depending on the application, the size of the PDCP control PDUs 70 stored in the RLC buffer 81 may also be included.

In a second embodiment, the BSR provides an estimation of the compressed size of data to be transmitted. This information is for example calculated based on the contents of the PDCP buffer 56 and a compression factor that has been achieved earlier for the data of the radio bearer of interest. In certain cases, the compression factor can also be a figure provided by the compression algorithm.

Alternatively, the estimation of the compression factor is provided by the eNodeB. The eNodeB can estimate this factor based on the compression ratio observed on previous PDUs by the RoHC decompression algorithm run in the eNodeB PDCP entity.

When the compression factor is estimated locally in the UE 10, an interesting possibility is to report the amount of uncompressed data contained in the PDCP buffer 56 at a relatively high frequency, for example, every 100 milliseconds or so, and to report the observed compression factor at a lower frequency, for example, every 1 second or 10 seconds. The eNodeB can then evaluate the amount of buffered data to be received form the UE by multiplying the last received value of the buffer size by the last received value of the compression factor.

The compression ratio can only be determined, by the compressor or decompressor, after a certain time because it depends on the compressor and the traffic type. The compressor or decompressor must first gain sufficient knowledge about the traffic and channel conditions.

Another possibility is to report only the size of the data that is already compressed (PDCP PDUs 60), plus information on the data that has not yet been compressed such as an estimation of the compressed size of the PDCP SDUs for which the compression has not yet been performed. Such estimation can be UE-based or result from a value of the compression ratio given from the eNodeB 20. This allows, for example in the case of VoIP, that if all available PDCP SDUs are already compressed and in the RLC buffer 81, the exact data volume, possibly including the RLC and MAC header is reported.

In general, an estimation of the size of the overhead due to the RLC/MAC headers can be included in the BSR, which increases the accuracy of the reporting.

In a typical embodiment, the UE reports uncompressed data to the eNodeB, namely the size of the contents of the PDCP buffer 56, and also compressed data, namely the size of the contents of the RLC buffer 56, or only of the user data PDUs 60. The MAC scheduling scheme in the eNodeB may then multiply the size of the uncompressed PDCP SDUs for each radio bearer that has not yet been compressed with a compression ratio given from the eNodeB, and add the size of the PDCP PDUs that are still waiting for transmission, plus possibly an overhead to account for the RLC/MAC header.

In the embodiment illustrated by FIG. 4, the buffer status reporting is performed as a medium access control (MAC) function. It will be appreciated that the buffer status report can also transmitted as part of a radio resource control (RRC) procedure.

For most types of measurement reporting (either on RRC or on MAC level) the information about the uncompressed data may be sufficient in the uplink, since the eNodeB can gain information on the compression ratio by means of the RoHC decompressor.

Information on the size of the compressed data is optional and further improves the accuracy. It is particularly useful in certain special cases, e.g. conversational data or the uplink TCP ACK message for which all PDCP SDUs are compressed immediately, where the MAC resource request should fit as much as possible the total amount of available data.

Embodiments of the invention have been disclosed above in the illustrative case of a 3GPP LTE system. Those skilled in the wireless communication art will appreciate that various modifications can be brought to these embodiments without departing from the invention and from the attached claims. They will also appreciate that the invention is applicable to communications systems other than 3GPP LTE systems.

What is claimed is:

1. A wireless device for communication with a network having a plurality of base stations, the wireless device comprising:

a packet data convergence protocol (PDCP) buffer for storing one or more user packets, wherein each of the one or more user packets comprises a header;

a packet data convergence protocol (PDCP) layer for converting the one or more user packets into one or more data units written to a radio link control (RLC) buffer of the wireless device, wherein the PDCP layer applies robust header compression (ROHC) to the header of each of the one or more user packets, and wherein control data units comprising information generated in the PDCP layer are written to the RLC buffer; and a transmitter for transmitting to a base station the one or more data units read from the RLC buffer and a buffer status report comprising information representing an amount of uncompressed data stored in the PDCP buffer that is to be transmitted from the wireless device.

2. The wireless device of claim 1, wherein the information representing the amount of uncompressed data stored in the PDCP buffer that is to be transmitted from the wireless device is further dependent on an estimation of a compression factor applied by the PDCP layer.

3. The wireless device of claim 1, wherein the transmitter is configured to transmit to the base station an additional buffer status report comprising an estimation of a compression factor achieved by applying the ROHC, the additional buffer status report transmitted at a lower frequency than the buffer status report indicating the amount of uncompressed data stored in the PDCP buffer.

4. The wireless device of claim 1, wherein control data units comprising information generated in the PDCP layer are written to the RLC buffer.

5. The wireless device of claim 1, wherein the buffer status report further indicates an amount of data stored in the RLC buffer.

6. The wireless device of claim 1, wherein the buffer status report further indicates an estimation of an amount of compressed data resulting from compression of the uncompressed data stored in the PDCP buffer.

7. The wireless device of claim 1, wherein the buffer status report further indicates an amount of compressed data stored in the RLC buffer.

8. The wireless device of claim 1, wherein the buffer status report further indicates an amount of data depending on a size of additional headers added for transmission of the one or more data units read from the RLC buffer.

9. The wireless device of claim 1, wherein the buffer status report is transmitted as part of a medium access control (MAC) procedure or a radio resource control (RRC) procedure.

10. The wireless device of claim 1, wherein the conversion of the one or more user packets into one or more data units is part of a packet data convergence protocol (PDCP) procedure.

11. The wireless device of claim 1, wherein the transmitter is a medium access control (MAC) layer.

* * * * *